United States Patent [19]

Weston

[11] Patent Number: 4,875,605
[45] Date of Patent: Oct. 24, 1989

[54] PRESSURIZED METERING DISPENSER

[75] Inventor: Terence E. Weston, Woodbridge, United Kingdom

[73] Assignee: Microvol Limited, Ipswich, England

[21] Appl. No.: 224,949

[22] PCT Filed: Dec. 16, 1987

[86] PCT No.: PCT/GB87/00909

§ 371 Date: Jul. 26, 1988

§ 102(e) Date: Jul. 26, 1988

[87] PCT Pub. No.: WO88/04638

PCT Pub. Date: Jun. 30, 1988

[30] Foreign Application Priority Data

Dec. 17, 1986 [GB] United Kingdom ............... 8630100
Mar. 6, 1987 [GB] United Kingdom ............... 8704639

[51] Int. Cl.⁴ .............................................. B65D 83/00
[52] U.S. Cl. ........................... 222/402.24; 222/402.18
[58] Field of Search ............. 222/402.1, 402.2, 402.18, 222/402.19, 402.24, 402.25

[56] References Cited

U.S. PATENT DOCUMENTS 3,092,107  6/1963  Froot ........................... 222/402.2 X
3,367,746  2/1968  Maurukas .
3,796,352  3/1974  Morane ........................ 222/402.2 X
4,673,107  6/1987  Obrist ........................... 222/402.2 X Primary Examiner—Joseph J. Rolla
Attorney, Agent, or Firm—Lee & Smith

[57] ABSTRACT

A pressurized metering dispenser comprises a main reservoir, a liquid metering chamber and a gas chamber. A valve arrangement enters the reservoir and the gas chamber from an outlet nozzle at the end of a central passage, the inboard end of which is above the level of liquid in the reservoir when the dispenser is held nozzle-down. A gas holding chamber communicates with the gas chamber and the liquid metering chamber with the reservoir in a normal state, and actuation is achieved by upward displacement of the nozzle to start off the liquid and gas holding chambers and from their supplies and finally cause the chamber to communicate with the chamber to cause the liquid to be expelled through the nozzle under the gas pressure in the chamber. A holder for such a dispenser includes an actuating lever and counter to indicate the number of actuations. A modified dispenser includes a sleeve which is resiliently displaceable relative to the lower end of a nozzle and indicates an extension of known internal volume into which liquid can be drawn by upward displacement, for mixing with reagent subsequently ejected through the nozzle on actuation of the dispenser.

9 Claims, 6 Drawing Sheets

REFILL                    DISCHARGE

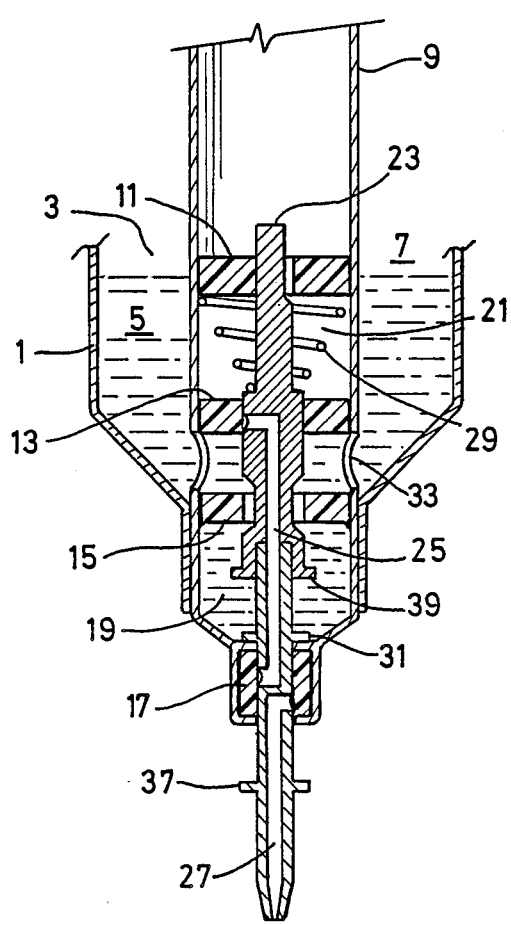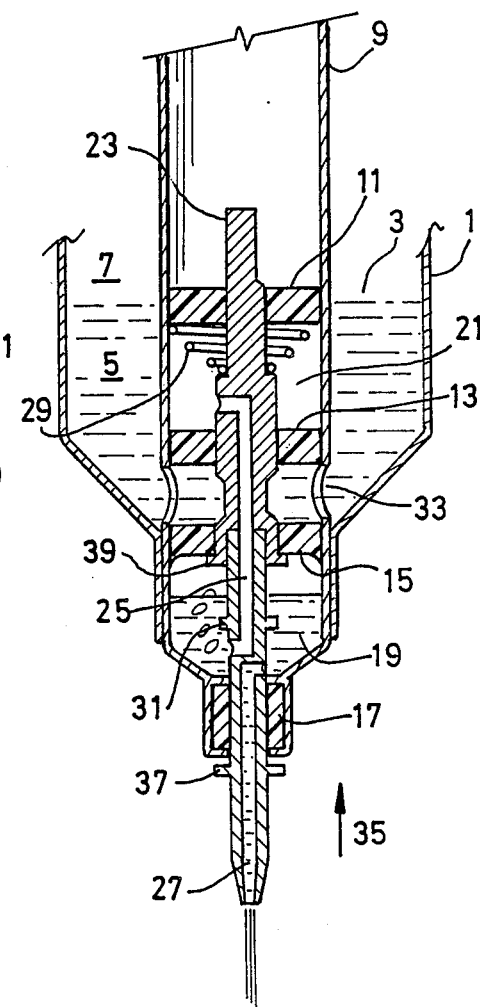
REFILL
Fig.1
DISCHARGE
Fig.2

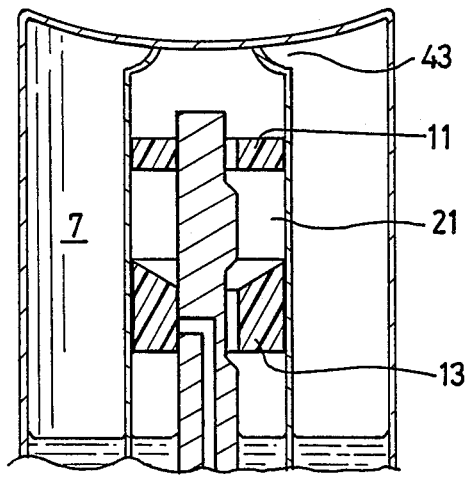
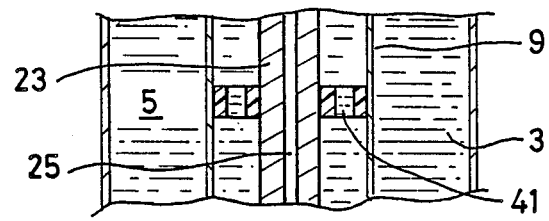
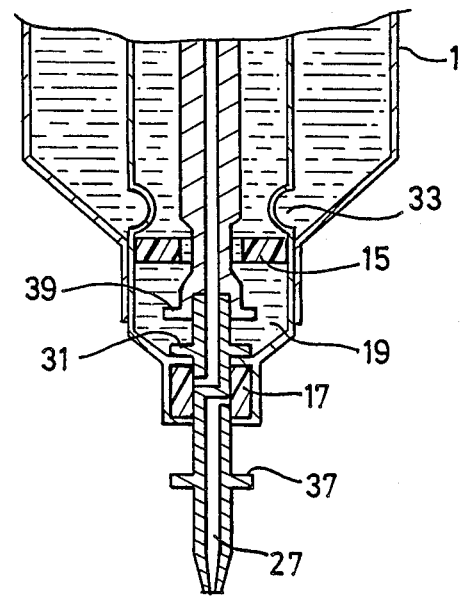
Fig.4

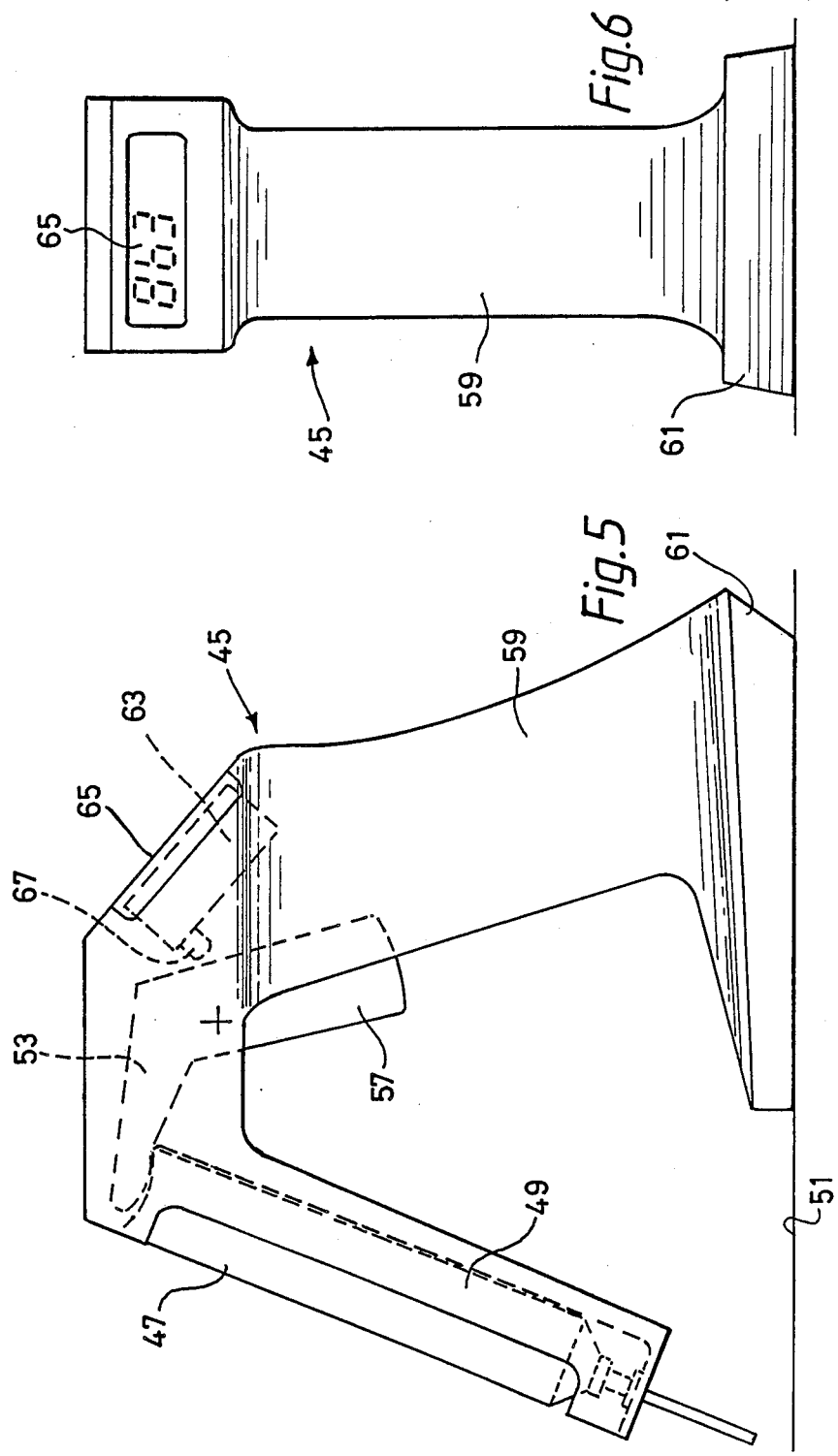

PRESSURIZED METERING DISPENSER

Field of the Invention

The present invention relates to a pressurised metering dispenser and to a holder and actuator for pressurised metering dispensers.

Background of the Invention

Metering liquid dispensers using gas pressure for discharging the liquid were invented in the 1950's. As with most common pressurised liquid dispensers, the liquid in such known metering dispensers is subdivided into minute droplets on leaving the dispenser, forming an aerosol.

The main use for such dispensers hitherto has been for administering metered doses of drugs for inhalation. Early forms of dispensers gave somewhat erratic metering, but improvements in valve designs and in formulations for the dispenser contents have led to pressurised metering liquid dispensers currently available which are capable of ± 1% on the nominal metered volume dispensed.

However, further variations occur during the period of use of a dispenser, reducing the overall dispensing accuracy to no better than ± 5%. One cause for this problem is that as the dispenser is used high vapour pressure components in the dispenser contents are preferentially discharged, and therefore depleted. Thus, when the dispenser is nearly empty the doses dispensed will have an increased concentration of low vapour pressure components, and the concentration of the active pharmaceutical ingredient may vary during the course of use of the dispenser.

A typical formulation in a known pressurised metering liquid dispensers used to administer pharmaceuticals for inhalation contains the pharmaceutical active ingredient, a mixture of propellents (typically fluorocarbons, 11, 12 and 114), a low volatility excipient and valve lubricant such as sorbitan trioleate and anti-oxidants, in solution in ethanol.

The dispensers perform their metering function by means of a metering chamber located within the dispenser and normally open to the main dispenser reservoir containing the formulation. When the dispenser is held in the correct position for use, the metering chamber is lowermost and filled with formulation. During actuation of the dispenser, the metering chamber is first closed from the main reservoir and then connected to a discharge passage. The pressure of the propellents contained in the formulation will then drive the contents of the metering chamber out through the discharge passage. As the formulation is released into the atmosphere, any propellents still in liquid form will tend to vaporise, assisting in the formation of the aerosol, and the ethanol solvent will also tend to evaporate. This evaporation tends to chill the discharge nozzle of the dispenser, and rapidly repeated discharges from the dispenser may result in the nozzle freezing.

In my co-pending application Ser. Nos. 8608571 and 8624064, it is suggested that a pressurised 1-shot metering dispenser may be used to deliver reagents during chemical analysis. It has also now been realised that there are many other situations in which it would be convenient to be able to deliver precisely metered volumes of liquid from a pressurised dispenser. For example, in many circumstances in medicine and chemistry it is necessary to prepare a sample before it can be analysed or studied. In such sample preparation, the sample may be diluted with distilled water or some other chemically pure diluant and stabilisers such as anti-oxidants, pH buffers etc may also be added. All of these must be added in precisely known quantities if accurate results are to be obtained from subsequent study or analysis.

Typically, the dispensing of accurate volumes in such circumstances is at present carried out using various types of pipettes and syringes. There are three main types of devices in use. The first are "air pipettes", in which a squeeze-bulb or syringe sucks up liquid by reducing the air pressure in the pipette, and then small amounts of liquid are dispensed by mechanically indexing a plunger. The second are positive displacement syringes, in which a plunger is brought up to the tip of the discharge nozzle and the syringe is filled and emptied by movement of the plunger. The third are single shot dispensers, which employ a pair of non-return valves and a syringe which is alternately filled and emptied to discharge a fixed volume.

The first type is the least accurate because there is a volume of air between the reagent and the piston or plunger. The second type is the most accurate because it relies on the movement of a piston in a very accurate bore and there is no air cushion between the liquid and the piston. The third type is less precise but is suitable for dispensing liquids from a bulk container. The best figure for repeatability of the volume dispensed from one discharge to another of the same device is around ± 1% for these types of device.

In addition to their lack of convenience, these devices suffer the following problems. First, the reagent or other liquid has to be drawn from a bulk supply, or made up immediately prior to use if it has a limited shelf life, and in all pipetting methods the liquid is in contact with the air during the dispensing operation. This provides opportunities for the liquid being dispensed to become contaminated by dust, dirt and bacteria, and the liquid itself may undergo a change through evaporation, oxidation or the like. Second, occasionally a droplet of liquid remains on the tip of the discharge nozzle of the device, so that one measure is under-volume and the next measure is over-volume. The range of metered volumes dispensed from such apparatus is typically from about 5 microlitres to 10 milliliters, and a droplet can represent a large percentage error at the lower end of this range.

In my earlier U.K. patent application Nos. 8608571 and 8624064, it is proposed that reagents for chemical analysis could be pre-packaged in a pressurised metering dispenser, in which case contamination and errors due to droplets remaining on the discharge nozzle are much less likely to occur. Additionally, the reagents can be made up by the manufacturer under controlled conditions to ensure consistent high quality and can be used in an environment in which the preparation of a reagent or its extraction from a bulk supply are impractical. The same principle can be used, and the same advantages obtained, in other circumstances in which a precisely metered volume of liquid is required to be dispensed.

However, the variation in the composition of the contents of the dispenser during use, as referred to above, means that the conventional arrangements for pressurised metering liquid dispensers cannot normally be applied to chemical analysis sample preparation etc. Additionally, it is frequently a disadvantage when dispensing a metered volume of liquid for the liquid to be dispensed in the form of an aerosol, whereas with the conventional pressurised dispenser arrangement the formation of an aerosol as the liquid is discharged is usually unavoidable. Furthermore, it is sometimes desired to dispense a metered volume of the same liquid into each of a series of containers in quick succession, in which case the tendency of the nozzle of a conventional dispenser to freeze on rapid repetition of discharges is inconvenient.

These difficulties with known pressurised metering dispensers could be largely reduced if not overcome completely by replacing the conventional fluorocarbon propellent with a pressurised chemically inert gas propellent such as nitrogen or argon, as is proposed in my earlier applications. In the prior art dispensers, the variation of the composition of the dispenser contents with use is largely due to high vapour pressure components in the propellent mix evaporating preferentially. If a compressed gas propellent is used in place of a condensed high vapour pressure substance the propellent does not dilute the liquid composition in the dispenser and thus the pattern of loss of propellent will have no effect on the concentration or composition of the liquid being dispensed. Since the propellent is already gaseous and tends not to be mixed with the liquid during discharge, the formation of an aerosol can normally be avoided if this is desired (although if required an aerosol can be formed by appropriate shaping of the discharge nozzle). Additionally, since the propellent is already gaseous it does not vapourise at the discharge nozzle so that the cooling of the discharge nozzle is greatly reduced.

Unfortunately, if such a gaseous propellent is used in place of the conventional fluorocarbon propellents in a conventional pressurised metering dispenser, the dispenser is unlikely to function correctly. In order for the metering to be accurate, the metering chamber must be sealed from the main reservoir for the dispenser contents before the outlet valve is opened. However, this means that the metering chamber is also sealed from the pressure prevailing in the main reservoir. Thus, if the liquid contained in the metering chamber does not include liquified admixed propellent, there will be no pressure within the metering chamber to drive the metered liquid dose out of the dispenser when the outlet valve is opened.

Summary of the Invention

According to the present invention there is provided a pressurised metering dispenser comprising a main reservoir, a liquid metering chamber and a gas holding chamber, arranged so that if the main reservoir is charged with a liquid and a pressurising gas and the dispenser is held in its position of use, the liquid metering chamber will normally be sealed from the environment and be in communication with the main reservoir to receive liquid therefrom and the gas holding chamber will normally be in communication with the main reservoir to receive gas therefrom, and during actuation of the dispenser the liquid metering chamber and the gas holding chamber pass through an intermediate state in which the liquid metering chamber is sealed from the external environment and from the main reservoir and the gas holding chamber is sealed from the main reservoir, and a final state in which the liquid metering chamber is open to the environment and the two chambers are in communication with each other but each sealed from the main reservoir.

The liquid metering chamber and the gas holding chamber may also be sealed from each other in the intermediate state. In this case, it is preferable that during the transition from the intermediate state to the final state the two chambers are placed in communication before the liquid metering chamber is opened to the environment.

The liquid metering chamber functions in a manner similar to the metering chamber in a prior art dispenser, and its volume determines the volume of liquid discharged from the dispenser at each actuation. The gas holding chamber provides a small charge of pressurised gas to drive the liquid in the liquid metering chamber so that pressurised dispensing of the liquid in the metering chamber occurs. In theory, this advantage could be obtained by providing means to connect the liquid metering dispenser to the pressurised gas propellent in the main reservoir, but in this case if the outlet valve was not closed promptly following discharge of the liquid from the metering chamber there would be a tendency for a complete loss of pressurising propellent from the dispenser. Thus it will be appreciated that the seal required between the gas holding chamber and the main reservoir can be relatively poor, provided that it is sufficient to avoid a general loss of pressurising gas during a normal dispensing operation. The quality of the seal between the liquid metering chamber and the main reservoir is more important, since any tendency for liquid to leak in either direction between the liquid melting chamber and the reservoir during discharge will alter the volume of liquid dispensed.

Advantageously, the dispenser has a longitudingly extending actuator body, which includes a discharge passage through which the liquid metering chamber is connected to the external environment in the final state of actuation of the dispenser, and movement of the actuator body from its normal position through an intermediate position to a final position seals the chambers from the reservoir and connects them together so as to bring about the said intermediate state of the chambers in the intermediate position of the body and the final state of the chambers in the final position of the body. Advantageously, the actuator body is resiliently biased to its normal position and movable against the bias to its intermediate position and on to its final position. Thus, the actuator body is automatically returned to its normal position when it is released, sealing the liquid metering chamber from the external environment and connecting the chambers to the reservoir for refilling.

Preferably, the actuator body is moved inwardly into the dispenser during an actuating stroke from its normal position via its intermediate position to its final position.

Preferably stop means are provided to limit the travel of the actuator body away from the intermediate position beyond the normal and final positions.

The liquid metering chamber and the gas holding chamber will normally be spaced from one another, in which case the actuator body conveniently contains a passageway within it, which opens into the two chambers connecting them together in the final position of the body.

Preferably, the metering chamber is at the bottom of the dispenser when the dispenser is in its position of use, so that in the normal state of the chambers liquid from the main reservoir tends to fill the metering chamber under the influence of gravity.

The liquid metering chamber and the gas holding chamber may be provided spaced apart within a central core of the dispenser, the portion of the central core between the two chambers being open to the reservoir and open to the liquid metering chamber in its normal state to allow liquid to flow into the chamber, and the portion of the central core on the side of the gas holding chamber remote from the liquid metering chamber also being open to the reservoir and being open to the gas holding chamber in its normal state to allow gas to flow into the chamber.

Normally, the gas holding chamber will be arranged to be higher than the liquid metering chamber when the dispenser is in its position of use, so that in the normal state each chamber is open to the portion of the central core above it.

If the gas holding chamber is positioned sufficiently high within the dispenser to be above the level of liquid in the reservoir when the dispenser is in its position of use, the gas holding chamber may be arranged to be in communication with the main reservoir at its lowest point when in the normal state, to permit the draining from the chamber of any liquid which might accidentally have entered the reservoir while the dispenser was in some other position. This drainage connection is preferably additional to the connection provided for entry of gas into the gas holding chamber, and is also closed in the intermediate and final states of the chamber during actuation of the dispenser. Preferably, during transition from the normal state to the intermediate state of the chamber, the drainage connection is closed before the gas holding chamber is sealed from the main reservoir.

According to a second aspect of the present invention there is provided a holder for a pressurised metering dispenser, comprising means to support a dispenser in its position of use and means to cause relative movement between the main body of a supported dispenser and an actuating member through an actuating stroke, the means for causing relative movement being itself manually actuable.

Preferably, the holder also comprises means responsive to actuation of the means to cause relative movement, which provides a signal when a predetermined number of actuations of the means for causing relative movement has occured since a dispenser supported in the holder was placed in position. The further means may be a counter which provides a signal in the form of a count value in response to each actuation of the means for causing relative movement. Alternatively, the further means may provide a warning signal, as for example a light or a buzzer, only when the predetermined number of actuations has been reached. In either case, the further means can be used to warn an operator that the contents of a dispenser supported in the holder have been almost entirely discharged. Conveniently, means is provided for varying predetermined number so that the number of actuations which occur before the warning signal is given can be varied to accommodate dispensers capable of discharging different numbers of metered doses.

Preferably, the holder has mounting means by which it may be mounted on a support surface with a supported dispenser in its position of use. This enables the dispenser to be located more accurately and more steadily with respect to a dish or the like in to which a dose of liquid is to be discharged than if the holder had to be supported by hand.

The means for causing relative movement between the main body of the dispenser and its actuating member may be powered, and comprise a solonoid or a motor etc. However, it is preferred that the means for causing relative movement is mechanical and driven by the manual actuation. In a preferred embodiment, this means comprises a lever one end of which bears on the dispenser and the other end of which is a manually operable trigger.

A holder according to the present invention provides a means of mounting and operating a pressurised metering dispenser in a laboratory separately from an analyser such as is disclosed in my earlier applications. Thus, dispensers might be used mounted in such holders during sample preparation and in the performance of tests and analyses which do not need to be carried out in analysis apparatus.

In accordance with another aspect of the invention, a modification may be incorporated in the discharge tube of a dispenser such as not exclusively of the type so far described, by which an accurate sample volume of a liquid to be analysed can be collected and subsequently dispensed, together with a metered dose of reagent.

The modification comprises a resiliently biased sleeve which downwardly surrounds the lower end of the dispenser nozzle and is prevented from passing beyond the end of the nozzle, and a nozzle extension of known internal volume, which extend from the sleeve beyond the dispenser nozzle but can be displaced upwardly relative to the nozzle end by an upwardly directed force on the lower end thereof. In use the lower end of the nozzle extension is pushed against the base of a dish or reservoir containing a sample liquid so that the sleeve is fully retracted and the dispenser is then allowed to rise thereby trapping a small quantity of the sample liquid in the nozzle extension. The liquid is held in place by surface tension and air pressure.

After removing the dispenser from the liquid, the retained sample can be ejected together with a quantity of reagent from the dispenser reservoir, by normal activation of the dispenser. Mixing of the sample and the reagent occurs during ejection.

Apart from the problems of reagent metering with currently available equipment, similar problems arise with the requirement to meter samples for analysis because the same equipment is used.

However, there is a more serious drawback in that sample carryover or contamination of a sample by a previous one can be caused by retention of sample on the walls of the pipette tip. This is overcome by scrapping the tip after each sample, or by wiping or washing the *outside* of the tip between samples, but the latter technique still leaves sample inside the tip. The only other way to avoid carryover is to draw up and discharge a quantity of cleaning fluid between samples, but this is time consuming in manual pipetting, or leads to increased complexity in automatic samples.

Embodiments of the present invention, are given by way of non-limitative example, will now be described with reference to the accompanying drawings, in which:

FIG. 1 is a partial sectional view of a pressurised metering dispenser embodying the present invention, in its normal state;

FIG. 2 is a partial sectional view of the dispenser of FIG. 1 in its final state of actuation;

FIG. 4 is a partial sectional view of a further dispenser embodying the present invention;

FIG. 5 is a side view of a holder embodying the present invention;

FIG. 6 is an end view of the holder of FIG. 5;

DETAILED DESCRIPTION OF THE ILLUSTRATED EMBODIMENTS

Figure 3:
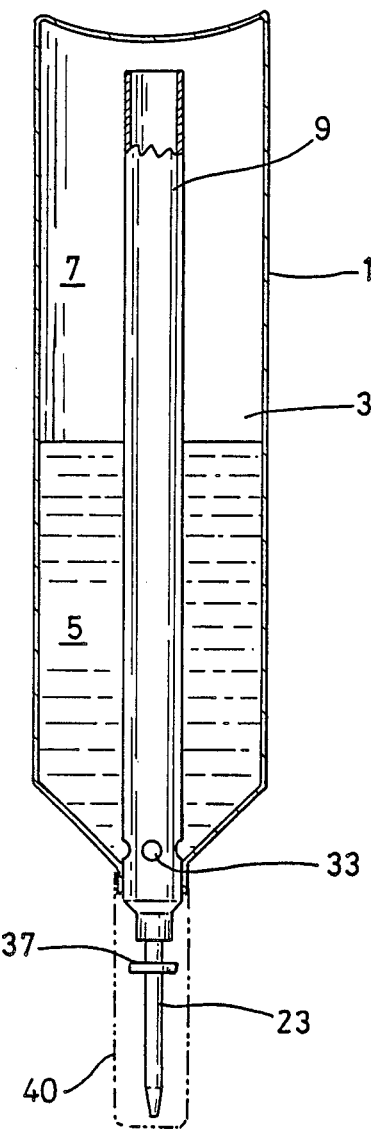
FIG. 3 is an overall view of the dispenser of FIGS. 1 and 2.

FIGS. 1 to 3 illustrate a pressurised metering dispenser. The metering and dispensing mechanism is shown in section in FIGS. 1 and 2. In the dispenser, a main body 1 defines a main reservoir 3, which is charged with a volume of liquid 5 and pressurised gas 7. The gas 7 functions to drive liquid positively out of the dispenser during discharge, by virtue of its pressure. Accordingly, it is at a pressure above atmospheric, typically about 400 kPa gauge, or 500 kPa absolute. The gas is preferably selected to be insoluble and chemically unreactive with the liquid 5, and will commonly be nitrogen or argon.

A central core 9 runs within the main body 1 from its mouth sufficiently far for its end to be above the level of liquid in the reservoir 3 when the dispenser is held mouth downwardly. Preferably, it runs for substantially all of the length of the main body 1. Within the central core 9, seals 11, 13, 15, 17 define a liquid metering chamber 19 and a gas holding chamber 21. In use, the volume of the liquid metering chamber 19 determines the volume of the metered dose of liquid dispensed from the dispenser in a single actuation.

An actuator body 23 is slidably mounted within the central core 9 and protrudes out through the mouth of the dispenser. It passes through the seals 11, 13, 15, 17 and co-operates with them to provide valves. Additionally, the actuator body 23 contains an internal gas passage 25 and an internal liquid discharge passage 27. Thus the actuator body 23 also functions as the discharge nozzle of the dispenser.

The actuator body 23 may conveniently be made of nylon or acetol; the valve seals may be made of nitrite butyl rubber. However, it is possible that, for dispensing particularly agressive liquids, it may be preferred to manufacture the body 23 of polypropylene on stainless steel and the seals of fluorocarbon rubber or PTFE based material.

A spring 29 acts on the actuator body 23 to bias it towards a normal position as shown in FIG. 1. In this position, further movement of the actuator body 23 is prevented by a lower stop flange 31. In this position, the chambers 19, 21 are each in their normal states and are in communication with the respective portions of the central core 9 above them.

The portion of the central core 9 between the liquid metering chamber 19 and the gas holding chamber 21 is in communication with the main reservoir 3 by means of apertures 33. Accordingly, the portion of the central core 9 immediately above the liquid metering chamber 19 is flooded with liquid 5, so that in the normal state of the liquid metering chamber as shown in FIG. 1 it also is filled with liquid. The portion of the central core 9 above the gas holding chamber 21 is in communication with the main reservoir at its upper end, so that this portion of the central core 9 is filled with pressurised gas 7. Accordingly, in the normal state the gas holding chamber 21 fills with gas at the pressure prevailing within the main reservoir 3.

In the normal state, both ends of the gas passage 25 are closed by seals 13, 17. The upper end of the liquid discharge passage 27 is also closed by seal 17 so that the inside of the dispenser is not in communication with the external environment.

To actuate the dispenser, the actuator body 23 is pushed upwardly into the dispenser in the director of arrow 35, against the action of the spring 29. Conveniently, the actuator body 23 may be moved by pressing against an actuation flange 37.

As the actuator body moves upwardly out of its normal position, wider portions of its become level with the seals 11, 15 which define the upper ends of the chambers 19, 21. This closes the passageways through which these chambers were in communication with the remaining portions of central core 9 and the main reservoir 3. The chambers 19, 21 thus enter a state in which they are sealed from each other and from the main reservoir 3.

As the actuator body 23 moves further up, the ends of the gas passage 25 clear the seals 13, 17 and the liquid metering chamber 19 and the gas holding chamber 21 are placed in communication with each other. The upper end of the liquid discharge passage 27 remains closed by the lowermost seal 17.

At the end of the actuation stroke, the actuator body 23 reaches its final position, shown in FIG. 2, in which the upper end of the liquid discharge passage 27 clears the seal 17 and enters the liquid metering chamber 19. Since the liquid in the liquid metering chamber 19 is at greater than atmospheric pressure, it begins to flow out of the dispenser through the discharge passage 27. As the liquid flows out of the metering chamber 19, the small charge of gas in the gas holding chamber 21 expands and passes through the gas passage 25 into the metering chamber 19, and thus pressure continues to be applied to the liquid remaining in the metering chamber 19. In this manner, the gas from the gas holding chamber 21 drives all of the liquid in the liquid metering chamber 19 positively out through the discharge passage 27, ensuring that the full metered dose of liquid is dispensed. Finally, the gas is vented to the atmosphere through the discharge passage 27, clearing any remaining liquid out of the passage and removing any droplets which may have formed at the nozzle of the dispenser.

The actuator body 23 is prevented from moving upwardly beyond its final actuation position by an upper stop flange 39.

On release of the external force applied to the actuation flange 37, the actuator body 23 moves downwardly under the influence of the spring 29 to return to its normal position as shown in FIG. 1, and the chambers 19, 21 refill with liquid 5 and gas 7 respectively from the main reservoir 3.

For ease of manufacturing, the actuator body 23 may be made in two separate pieces as is shown in FIGS. 1 and 2. Since the spring 29 acts on the upper piece of the actuator body 23, the two pieces are always pressed together in all positions of the actuator body 23.

The dispenser may also be provided with a snap-off security nozzle cover 40, as shown in broken lines in FIG. 3.

Although the pressurised metering dispenser of FIGS. 1 to 3 is intended primarily to dispense a metered dose of liquid as a stream, a suitable known device may be fitted to the discharge nozzle end of the actuator body 23 to divide the discharge liquid into a spray of aerosol of finely divided droplets. Accordingly, the dispenser may be used for the same purposes as conventional metering dispensers using fluorocarbon propellents. This may be desirable from the environmental point of view, as it enables the fluorocarbons to be replaced by less harmful propellents.

FIG. 4 shows an alternative dispenser embodying the present invention, in which the gas holding chamber 21 is positioned differently from the arrangement shown in FIGS. 1 and 2. In most respects, the dispenser of FIG. 4 is the same as the dispenser of FIGS. 1 to 3, and like parts are given the same reference numerals. Although not shown in FIG. 4, resilient means such as the spring 29 is provided to urge the actuator body 23 downwardly into the normal position, which is illustrated in FIG. 4.

In the embodiment of FIG. 4, the gas holding chamber 21 is positioned at the end of the dispenser remote from the discharge nozzle and the liquid metering chamber 19. Accordingly, the actuator body 23 has to extend for most of the length of the dispenser. In order to ensure that it remains correctly positioned, an apetured spacer ring 41 is provided within the central core 9, intermediate the liquid metering chamber 19 and the gas holding chamber 21. The spacer ring 41 is apertured so that it has no sealing effect and does not tend to support liquid in the core 9 above it or alter the pressure on the liquid in the central core 9 below it.

When positioned as shown in FIG. 4, the gas holding chamber 21 is above the surface of the liquid 5 when the dispenser is in its position of use. This avoids any tendency for liquid 5 to flow into the chamber 21. Additionally, in the normal state the gas holding chamber 21 in FIG. 4 is open both at its top and at its bottom, and the seal 13 is so shaped that the bottom surface of the gas holding chamber 21 slopes downwardly towards the lower opening. Accordingly, if any liquid 5 should enter the gas holding chamber 21, as may occur if the dispenser is inverted or laid on its side, the liquid will immediately drain out of the chamber 21 through the lower opening when the dispenser is moved to its position of use. In this way, it is ensured that the gas holding chamber 21 is always filled with pressurised gas 7 and never contains any liquid 5 when the dispenser is actuated in the correct manner, thus ensuring that the amount of liquid dispensed is correct and that there is sufficient gas in the gas holding chamber 21 to expel it effectively.

As the actuator body 23 is moved upwardly into the dispenser during an actuating stroke, the lower opening of the gas holding chamber 21 is closed first, and then the upper opening is also closed, sealing the gas holding chamber 21 from the main reservoir 3. As in the embodiment of the FIGS. 1 to 3, after the two chambers 19, 21 have been sealed from the main reservoir 3, the ends of the gas passage 25 clear the seals 13, 17 and the chambers are placed in communication. Finally, the upper end of the liquid discharge passage 27 clears the lowermost seal 17 and the liquid in the liquid metering chamber 19 is discharged.

In contrast to the arrangement shown in FIG. 3, the central core 9 in the embodiment of FIG. 4 extends over the entire length of the dispenser, contacting the end surface of the main body 1 remote from the discharge nozzle, but has apertures 43 around its upper end. This feature may be combined with the mechanism shown in FIGS. 1 and 2, and the arrangement of the central core 9 shown in FIG. 3 may be used with the mechanism shown in FIG. 4.

The mechanism shown in FIG. 4 may be varied by removing the opening at the top of the gas holding chamber 21 so that in its normal state the chamber 21 is only open downwardly. In this case, apertures would have to be provided in the central core 9 below the level of the gas holding chamber 21 so that in its normal state the chamber is in communication with the main reservoir 3. However, the arrangement shown in FIG. 4 is prefered to this alternative since the upper opening from the gas holding chamber 21 not only serves to place the chamber in communication with the main reservoir but acts as a gas inlet during draining of any liquid which might have entered the gas holding chamber 21. In the absence of such an upper opening liquid might fail to drain quickly and completely from the chamber when the dispenser is moved into its position of use.

The main body 1 of the dispenser will normally be metal, but other materials such as glass may be used provided that they can withstand the pressure within the dispenser. If the main body 1 is transparent an operator can see easily how much liquid 5 remains within the dispenser to be dispensed. However, it will often be preferred to make the man body 1 opaque in order to avoid photochemical effects on the liquid 5 from outside light.

The liquid 5 is prepared and introduced into the dispenser during manufacture under controlled conditions, so that it is relatively easy to guarantee that its formulation is correct. Because nothing enters the dispenser in use, the liquid is protected from oxidation, contamination etc, and its sterility is maintained.

Each successive dose is dispensed via the same liquid metering chamber 19, so that the repeatability of the doses (lack of variation in volume from dose to dose) is good.

FIGS. 5 and 6 show a holder 45 for a pressurised metering dispenser as shown in FIGS. 1 to 4. A dispenser 47 can be removably located in support means in a supporting arm 49, which holds the dispenser in its position of use with the tip of its discharge nozzle raised slightly above the surface 51 of the bench on which the holder sits. Thus a sample-holding container may be placed under the nozzle of the dispenser 47 and a metered dose of the liquid in the dispenser may be discharged into the container as part of a sample preparation or analysis procedure.

The dispenser 47 is actuated by its main body being driven downwardly by one end of an actuating lever 53. The actuating lever 53 is pivoted part way along its length at 55, and its end remote from the dispenser 47 forms a manually operable trigger 57. Thus, an operator may grasp the upright portion 59 by hand from the rear with a finger on the trigger 57, and may apply a precisely metered dose of liquid from the dispenser 47 by squeezing the trigger 57 firmly. The holder 45 remains stably supported on the surface 51 of the bench or the like by its broad base portion 61.

At the top rear of the holder 45 there is a counter 63, with its display 65 visable to the operator. Operation of the trigger 57 to actuate the dispenser 47 will also depress a button 67 which operates the counter 63.

If the counter 63 is reset to zero when a fresh dispenser 47 is fitted into the holder 45, the counter display 65 can be arranged to display the number of actuations of the dispenser and thus the number of metered doses of liquid discharged from it. This provides the operator with a warning when the total number of metered doses available from the dispenser 47 is being approached. Alternatively, the counter 63 may be arranged to be set to the total number of doses within the dispenser 47 when the new dispenser is fitted and arranged to count down so that the display 65 shows how many doses remain within the dispenser 47 to be discharged.

In addition to warning the operator that a dispenser 47 is nearly empty by means of the count on the counter display 65, the counter 63 may also give some other predetermined warning signal at a specific count, such as lighting a light, sounding an alarm or moving a shutter into or out of the area of the display 65 to present a warning mark to the operator.

The counter 63 may be electronic and powered by a small battery. Alternatively, it may be entirely mechanical and driven by the movement of the operating button 67.

Preferably, if the counter counts down from the total number of doses in the dispenser the initial count to which it is set can be varied. If a further signal is given that the dispenser 47 is nearly empty, in addition to the count value, then preferably the number of times the trigger 57 is operated before the further signal is given can be varied. In this way, the operation of the counter 63 may be adapted to different dispensers 47 containing different numbers of doses.

It is also possible to attach an atomiser or nebulizer to the dispenser, so that the dispensed liquid is dispersed into droplets in like manner to an aerosol spray.

Figure 7:
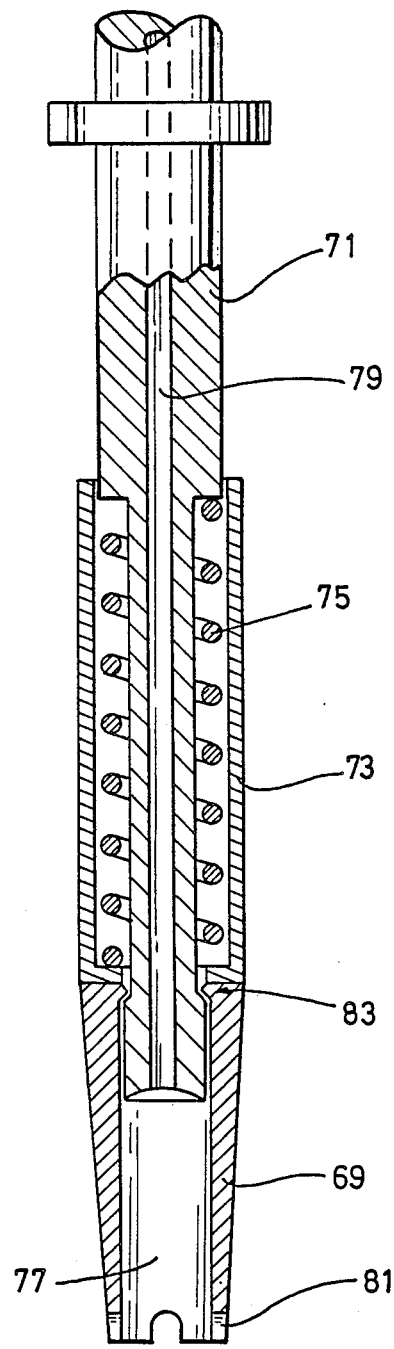
FIG. 7 is a cross-section through a discharge tube of a dispenser which incorporates a modification for collecting accurate sample volumes of a liquid to be analysed.
Figure 8:
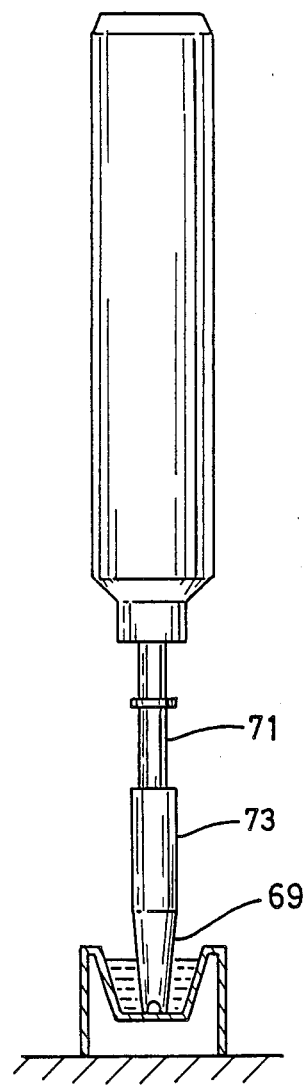
FIG. 8 illustrates such a modified dispenser placed in a well containing a liquid of which a sample volume is required to be collected.

FIG. 7 shows a section through a discharge tube of a modified dispenser of FIG. 8.

A tip 69 of a sleeve 73 of the dispenser is lowered into contact with the bottom of a well containing a liquid sample (see FIG. 8), and by pressing down on the dispenser, the lower end of a nozzle of a tube 71 slides down through the surrounding tip 69 until it also touches the well bottom. When the dispenser is withdrawn, a compression spring 75 mounted in the sleeve 73 surrounding the nozzle, urges the nozzle end upwards relative to the tip 69 and thus traps a volume of the liquid sample in a chamber 77 formed by the tip 69. The liquid is retained in the chamber 77 by air pressure and surface tension, in known manner.

The dispenser is then held over a suitable reaction receptacle (not shown) and operated as described hereinbefore, which causes a metered volume of reagent in the dispenser contents to travel through a conduit 79 in the tube 71 and to mix with and discharge the trapped liquid sample in the chamber 77.

For convenience, the tip 69 and sleeve 73 may be manufactured from a resilient plastics material. The tip 69 is removable by giving a firm pull, but is normally retained on tube 73 by a shoulder at 83 which also acts as a seal to prevent or reduce the ingress of air which would cause loss of sample. The shoulder 83 on the tip 69 is also a slidable interface fit on tube 71 so that a depression is maintained inside tip 69 during sampling. The slots 81 in the tip 69 prevent blockage if the tip 69 is placed squarely on the liquid container bottom. The spring 75 is substantially weaker than the spring in the dispenser so that there is less likelihood of discharging the dispenser contents into the sample container during sampling.

As a result of the modifications the dispenser possesses the following advantages:

1. The inside of the tip 69 is washed by the metered volume of reagent from the dispenser, and it is necessary only to wipe the outside of the tip to ensure zero carryover.
2. The sample volume may be varied easily by fitting a tip of different length.
3. A complete cycle of sampling and adding reagent is accomplished in less than half the time required when using existing methods.
4. There is a good mixing of the two liquids during dispensing.
5. Because there is an excess of metered gas during each operation of the dispenser, the complete conduit and tip is emptied each time.
6. Manual or automatic equipment would use exactly the same sampler/dispenser.
7. Solid displacement pipetting.

As will be apparent to those skilled in the art, many variations on the illustrated embodiments are possible.

I claim:

1. A pressurised metering dispenser comprising a main reservoir, a liquid metering chamber and a gas holding chamber, arranged so that if the main reservoir is charged with a liquid and a pressurising gas and the dispenser is held in its position of use, the liquid metering chamber will normally be sealed from the environment and be in communication with the main reservoir to receive liquid therefrom and the gas holding chamber will normally be in communication with the main reservoir to receive gas therefrom, and during actuation of the dispenser the liquid metering chamber and the gas holding chamber pass through an intermediate state in which the liquid metering chamber is sealed from the external environment and from the main reservoir and the gas holding chamber is sealed from the main reservoir, and a final state in which the liquid metering chamber is open to the environment and the two chambers are in communication with each other but each sealed from the main reservoir.

2. A pressurised metering dispenser as claimed in claim 1 in which the liquid metering chamber and the gas holding chamber are also sealed from each other in the intermediate state.

3. A pressurised metering dispenser as claimed in claim 2 in which during the transition from the intermediate state to the final state the two chambers are placed in communication before the liquid metering chamber is opened to the environment.

4. A pressurised metering dispenser as claimed in claim 1 in which the dispenser has a longitudingly extending actuator body, which includes a discharge passage through which the liquid metering chamber is connected to the external environment in the final state of actuation of the dispenser, and movement of the actuator body from its normal position through an intermediate position to a final position seals the chambers from the reservoir and connects them together so as to bring about the said intermediate state of the chambers in the intermediate position of the body and the final state of the chambers in the final position of the body.

5. A pressurised metering dispenser as claimed in claim 4 wherein the actuator body is resiliently biased to its normal position and movable against the bias to its intermediate position and on to its final position, whereby the actuator body is automatically returned to its normal position when it is released, sealing the liquid metering chamber from the external environment and connecting the chambers to the reservoir for refilling.

6. A pressurised metering dispenser as claimed in claim 1, in which the liquid metering chamber and the gas holding chamber are spaced from one another and the actuator body contains a passageway within it, which opens into the two chambers connecting them together in the final position of the body.

7. A pressurised metering dispenser as claimed in claim 1 in which the gas holding chamber is arranged to be higher than the liquid metering chamber when the dispenser is in its position of use, so that in the normal state each chamber is open to the portion of the central core above it.

8. A pressurised metering dispenser as claimed in claim 1 and a holder therefor comprising means to support the dispenser in its position of use and means to cause relative movement between the main body of the supported dispenser and an actuating member through an actuating stroke, the means for causing relative movement being itself manually actuable.

9. A pressurised metering dispenser as claimed in claim 1 which includes a nozzle through which reagent is ejected during dispensing, and which further includes a sleeve surrounding at least the lower end of the nozzle, the sleeve being resilitntly displaceable in a direction to expose the lower end of the nozzle, the lower end of the sleeve defining a volume into which a liquid can be drawn by movement of the lower nozzle end in an upward direction relative to the lower end of the sleeve.

* * * * *